United States Patent [19]
Brunelle et al.

[11] Patent Number: 6,120,194
[45] Date of Patent: Sep. 19, 2000

[54] PHOTOGRAPHIC LIQUIDS EFFLUENT DISCHARGE

[75] Inventors: Denis Brunelle, Pointe Claire; John Riviere, Beaconsfield; Bernard Gravel, Pointe Claire; Jian Min Ren, St. Laurent, all of Canada

[73] Assignee: Metafix Inc., Montreal, Canada

[21] Appl. No.: 09/247,912

[22] Filed: Feb. 11, 1999

[51] Int. Cl.[7] .................................. C02F 1/66; G03D 3/02
[52] U.S. Cl. .................... 396/565; 396/626; 210/207; 210/719; 266/170
[58] Field of Search ...................................... 396/626, 630, 396/565; 210/202, 207, 244, 248, 713, 719; 430/399; 266/170

[56] References Cited

U.S. PATENT DOCUMENTS

| | | | |
|---|---|---|---|
| 4,608,177 | 8/1986 | Woog . | |
| 5,229,009 | 7/1993 | Woog | 210/719 |
| 5,298,170 | 3/1994 | Woog | 210/719 |
| 5,317,360 | 5/1994 | Woog | 396/630 |
| 5,792,347 | 8/1998 | Bathurst et al. . | |

*Primary Examiner*—Alan A. Mathews
*Attorney, Agent, or Firm*—Swabey Ogilvy Renault; Kevin P. Murphy

[57] ABSTRACT

Spent color photography liquids comprising alkaline developer liquid and fixer liquid loaded with iron ions generate a dischargeable effluent, in which clogging of drains and conduits with precipitated iron oxides is minimized or avoided; the liquids are fed through separate feed ports into a vessel to form a liquid bath, the feed ports being isolated from each other and from the liquid bath; liquid effluent is pumped from the bath to form an effluent flow; preferably the pumping employs a suction generated by flow of a carrier liquid such as water through a venturi passage, whereby the liquid effluent is entrained in the flowing water and discharged under pressure, the precipitated iron oxides being retained in a dispersed non-clogging state.

21 Claims, 2 Drawing Sheets

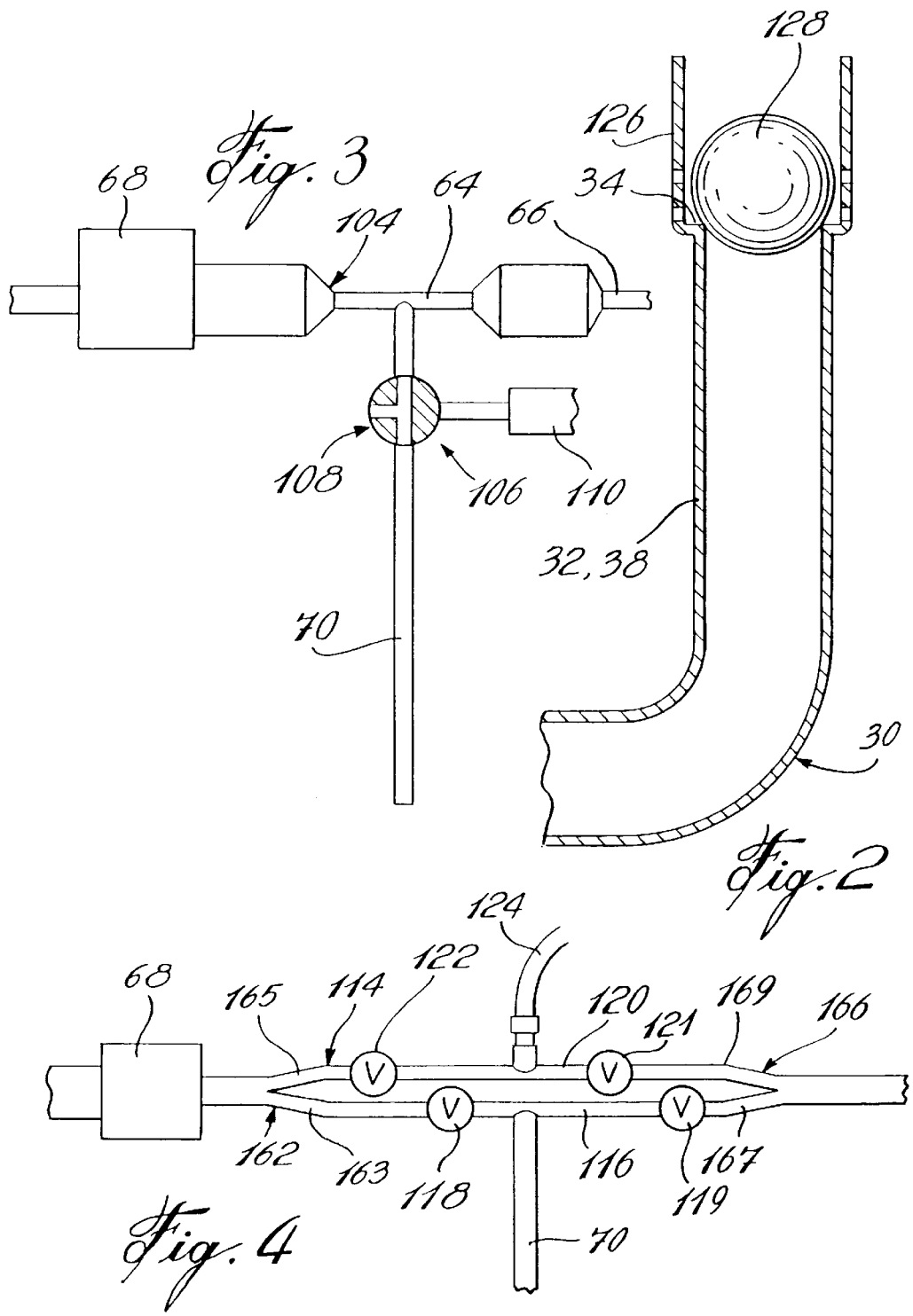

PHOTOGRAPHIC LIQUIDS EFFLUENT DISCHARGE

BACKGROUND OF THE INVENTION a) Field of the Invention

This invention relates to a discharge assembly and method for generating a dischargeable effluent from spent photographic liquids; more especially the invention is concerned with such a discharge assembly and method for generating a dischargeable effluent from separate feeds of a colour photography, de-silvered spent photographic fixer liquid containing iron ions, and a colour photography, spent alkaline photographic developer liquid.

b) Description of Prior Art

Colour photography processing employs a developer liquid which develops the image in an exposed film, and a fixer liquid which fixes the developed image.

The developer liquid is highly alkaline typically having a pH of 10 to 11; and the fixer liquid is substantially neutral, typically having a pH of 6.5 to 7.5. The two liquids are recycled in use until they are considered spent.

Silver ions from the photographic film accumulate in the spent fixer, and are recovered by exchange with iron whereby silver metal precipitates from the spent fixer liquid, to form a spent fixer liquid loaded with iron ions. The spent fixer liquid also has a natural content of iron ions derived from an iron ion content in the original fixer liquid.

Photographic processing sites typically may only have access to a single drain for discharge of the spent fixer and developer liquids, and thus it would be convenient to discharge them together into the drain.

When the spent fixer and developer liquids contact each other, especially in the presence of atmospheric oxygen, iron ions in the spent fixer liquid precipitate as iron oxides which clog the drain and conduits through which the spent liquids flow together. This clogging results in flooding of surrounding areas with the liquids, requiring that the areas and the clogged drain and conduits be cleared.

The precipitation of the iron oxides from the iron ions of the spent fixer liquid arises as a result of the increase in pH when the spent fixer liquid contacts the highly alkaline spent developer liquid. This precipitation is enhanced in the presence of oxygen gas, such as is present in the atmosphere.

U.S. Pat. No. 5,792,347 of J. Riviere et al describes an effluent precipitation and neutralization vessel for spent fixer liquid and spent developer liquid, however, in that U.S. Patent the spent fixer liquid was acidic. Acidic fixer liquids are employed in black and white photographic processing and X-ray processing.

The problem of iron oxides precipitation and consequent clogging is more severe with the spent liquids employed in colour photography processing and may occur in all locations where the two spent liquids are in contact.

SUMMARY OF THE INVENTION

It is an object of this invention to provide a method for generation of a dischargeable effluent from colour photography spent fixer and developer liquids of the type described hereinbefore.

It is a further object of this invention to provide a discharge assembly for generating a dischargeable effluent from colour photography spent fixer and developer liquids of the type described hereinbefore.

In accordance with one aspect of the invention there is provided a method of generating a dischargeable effluent from color photography, de-silvered spent photographic fixer liquid containing iron ions, and colour photography, spent alkaline photographic developer liquid, comprising: i) feeding a colour photography, de-silvered, spent photographic fixer liquid containing iron ions from a first feed port, and feeding a colour photography spent alkaline photographic developer liquid from a second port to form a mixed liquid bath of a liquid effluent in which iron oxide is precipitated as the liquids mix, said liquid bath having an upper bath surface, ii) pumping liquid effluent from said bath to form an effluent flow, and discharging said effluent flow into a drain, and iii) maintaining said upper bath surface spaced below said first and second feed ports, such that said first feed port is isolated from said liquid effluent and said developer liquid, and said second feed port is isolated from said liquid effluent and said fixer liquid.

In accordance with another aspect of the invention there is provided a discharge assembly for generating a dischargeable effluent from colour photography, de-silvered spent photographic fixer liquid containing iron ions, and colour photography, spent alkaline photographic developer liquid comprising: a) a housing for supporting a mixed liquid bath of a liquid effluent derived from the fixer liquid and the developer liquid, b) a first feed port for feeding fixer liquid into said housing, and a second feed port for feeding developer liquid into said housing, said first and second feed ports being disposed in said housing such that said first feed port is isolated from the liquid effluent and the developer liquid and the second feed port is isolated from the liquid effluent and the fixer liquid, and c) a discharge assembly comprising: i) pumping means for pumping liquid effluent from said bath to form a effluent flow, and ii) a discharge means for discharging the effluent flow from said pumping means.

DESCRIPTION OF PREFERRED EMBODIMENTS

In operation of the method the feed ports which feed the spent fixer liquid loaded with iron ions, and the highly alkaline spent developer liquid are disposed so as to avoid contact between the spent liquids and between the spent liquids and the liquid bath, at or within the feed ports. In this way precipitation of iron oxides in the feed ports or within the feed conduits which deliver the respective spent liquids to their feed ports is avoided.

This non-contacting relationship can be achieved by disposing the feed ports in spaced apart relationship above, and preferably remote from the upper surface of the liquid bath.

In an especially preferred embodiment each feed conduit extends into the liquid bath through a wall of the housing which supports the bath, and has an L-bend within the housing to form a vertically extending leg of the feed conduit, a lower end of the leg being submerged in the liquid bath and an upper end extending above the upper surface of the bath and terminating in the feed port spaced remotely from the highest level that the upper surface of the liquid bath might reach during use.

Suitably the feed ports face upwardly towards the top of the housing and away from the liquid bath and spent liquid exiting the feed ports cascades downwardly from the feed ports into the liquid bath below.

Preferably spend fixer liquid exits the feed port and cascades downwardly into the liquid bath while maintaining the feed port filled or flooded with the spent fixer liquid, thereby reducing the surface area of spent fixer liquid in contact with the atmosphere above the liquid bath. This reduces or minimizes precipitation, in the feed port, of iron oxides resulting from exposure of the spent fixer liquid to air.

The spent liquids may be fed from the feed ports on a continuous, continual or intermittent basis depending on the manner of operation of the photographic processing and whether the spent liquids from the photographic processing are removed continuously, continually or intermittently from such processing for discharge.

The liquid effluent in the liquid bath is pumped from the bath as additional spent liquids enter the bath and typically the volume of the liquid bath remains within a predetermined range as spent liquids enter the bath and liquid effluent is removed by being pumped from the bath.

Within the liquid bath iron oxides precipitate as the highly alkaline spent developer liquid contacts the spent fixer liquid in the interior of the bath and in the region of the upper surface of the bath where the mixed liquid bath is exposed to the atmospheric oxygen above the upper surface of the bath.

The precipitated iron oxides settle under gravity to a solids collection zone at the bottom of the liquid bath, although smaller iron oxide particles may remain suspended in the bath above the solids collection zone, and may be entrained in the liquid effluent pumped from the bath.

Suitably the liquid effluent is pumped from a location in the interior of the liquid bath, above the solids collection zone.

Various pumping techniques can be employed, as will be understood by those in the art, however, a pumping technique which employs a flowing carrier liquid such as water to entrain the liquid effluent in the liquid bath and form the effluent flow, is especially preferred. The flowing carrier liquid serves to disperse suspended iron oxide particles, reducing aggregation of the particles into large agglomerates which might clog the draining system.

Suitably the flowing carrier liquid is employed in a volume ratio of carrier liquid to entrained liquid effluent of at least 1.5:1 and while higher ratios of 10:1 or more may be employed, such high ratios are unnecessary, and wasteful in the use of the carrier liquid. In general a ratio of 2:1 is preferred In an especially preferred embodiment the liquid effluent is pumped by being suctioned through an elongate conduit extending into the liquid bath, which conduit communicates with a venturi passage through which the liquid carrier, preferably water flows; the flow of the liquid carrier along the venturi passage creates a vacuum or low pressure within the elongate conduit, thereby suction pumping liquid effluent from the bath into the elongate conduit and thence into the venturi passage where it is entrained by the flowing carrier liquid.

Suitably the inlet of the elongate conduit is covered with or surrounded by a filter screen such as a mesh, the apertures of which are smaller in size than the verturi passage, so as to filter from the liquid effluent entering the inlet of the elongate conduit, iron oxide particles having a size that would not pass along the venturi passage. In this way blockage of the venturi passage by iron oxide particles is avoided.

While not essential, preferred embodiments of the method and apparatus employ liquid level sensors to detect when the liquid level in the bath rises to a first predetermined level or falls to a second predetermined level. The suction pumping of the liquid effluent may be activated when a first sensor detects the liquid level at the first predetermined level, and discontinued when a second sensor detects the liquid level at the second predetermined level. Alternately, the pumping of the liquid effluent may be discontinued by a timer. An alarm sensor may also be employed as a safety measure to detect when the liquid effluent rises too high, providing a visual or audible alarm for the operator.

BRIEF DESCRIPTION OF DRAWINGS

FIG. 2 is a detail of an alternate conduit structure for use in the assembly of FIG. 1;

FIG. 3 is a detail of an alternative embodiment of a pumping unit for the assembly of FIG. 1; and FIG. 4 is a detail of still another embodiment of a pumping unit for the discharge assembly of FIG. 1.

Figure 1:
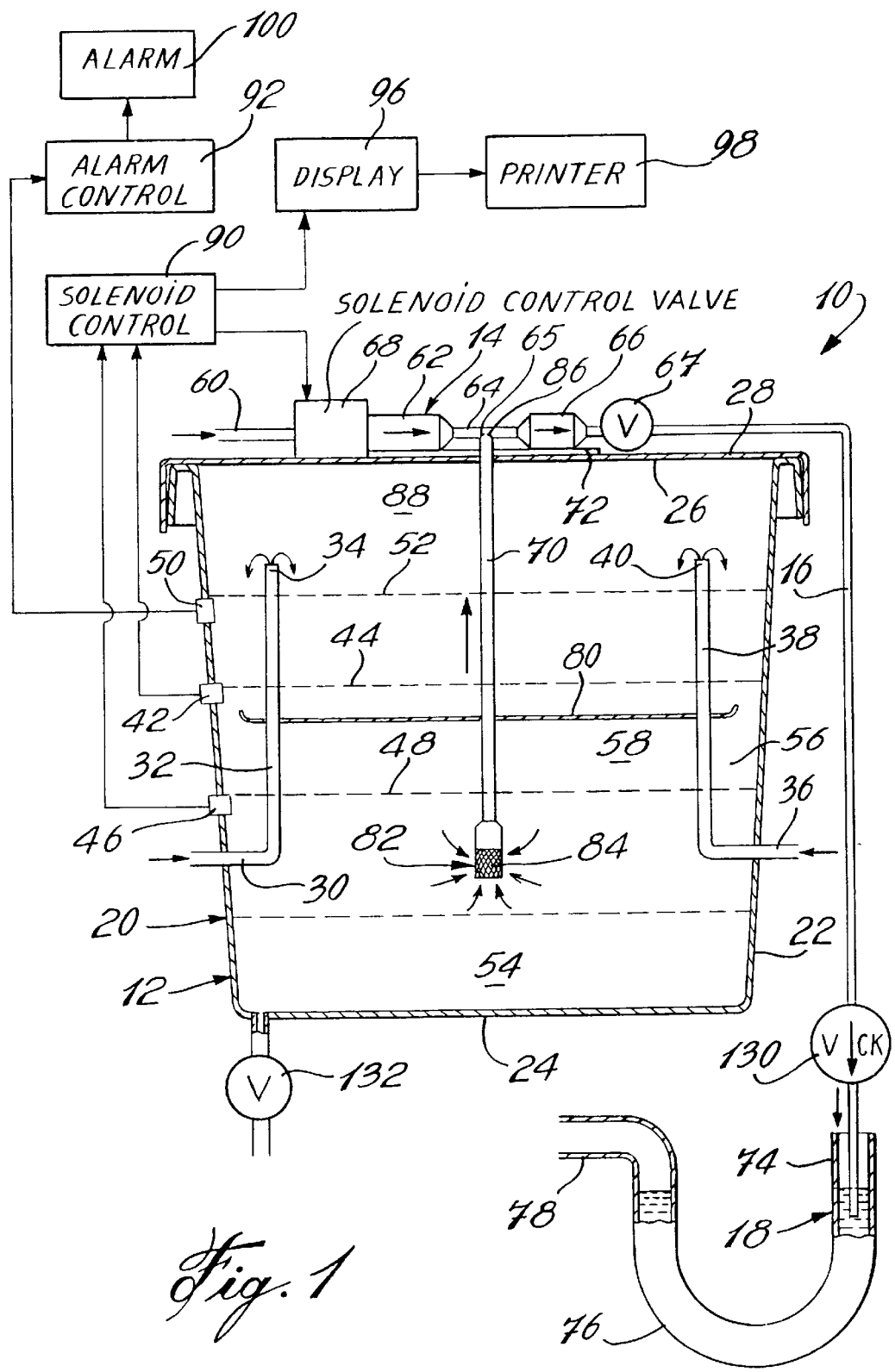
FIG. 1 is a schematic representation of a discharge assembly for generating a dischargeable effluent from spent photographic liquid s of the invention.

DESCRIPTION OF PREFERRED
EMBODIMENTS WITH REFERENCE TO THE
DRAWINGS

With further reference to FIG. 1, a discharge assembly 10 has a vessel 12 and a pumping unit 14. Discharge assembly 10 discharges an effluent flow through a discharge conduit 16 into a drain 18.

Vessel 12 comprises a bucket 20 having a wall 22, a floor 24 and an open top 26. Open top 26 is closed by a cover 28.

A fixer conduit 30 extends through wall 22 to the interior of bucket 20. Fixer conduit 30 has a vertical leg 32 terminating in a feed port 34.

Similarly a developer conduit 36 extends through wall 22 to the interior of bucket 20 and includes a vertical leg 38 terminating in a feed port 40. In use conduits 30 and 36 are connected to a source of spent fixer and spent developer in a colour photography processor.

Bucket 20 has a sensor 42 associated with a predetermined upper liquid level 44 and a sensor 46 associated with a predetermined lower liquid level 48. Bucket 20 additionally has an alarm sensor 50 associated with an uppermost liquid level 52.

The sensors 42, 46 and 50 are optional although preferred.

A solids collection zone 54 is defined in a lower region of a liquid bath 56 formed in bucket 20, and an effluent zone 58 is defined above the solids collection zone.

As shown in FIG. 1, liquid bath 56 has an upper bath surface 80, the location of which may vary during operation, and an atmosphere 88 of air and thus containing oxygen is disposed above upper bath surface 80.

Pumping unit 14 comprises a flow drive conduit 62 having an inlet 60 and an outlet 66. A venturi passage 64 is disposed in flow drive conduit 62. Manually controlled valve 67 is located in outlet 66.

Venturi passage 64 has an entry port 65. Entry of flowing carrier liquid into flow drive conduit 62 at inlet 60 is controlled by a solenoid control valve 68.

Pumping unit 14 further includes an elongate suction conduit 70 which has an inlet 82 and an outlet 86. A filtering screen 84 is disposed about inlet 82. Outlet 86 communicates with entry port 65 of venturi passage 64.

The inlet 82 of suction conduit 70 is disposed in effluent zone 58 below level 48, and is spaced above solids collection zone 54 to minimize withdrawal into suction conduit 70 of iron oxide particles settling and collecting in zone 54.

Pumping unit 14 is mounted by mounting frame 72 on cover 28 with flow drive conduit disposed above an upper face of cover 28 and suction conduit 70 extending through cover 28 into liquid bath 56.

Drain 18 has a drain inlet 74, a P-trap 76 and a drain conduit 78.

Sensors 42 and 46 dispatch signals to switch control 90 which operates solenoid control valve 68.

Alarm sensor 50 operates an alarm control 92 which activates an alarm 100 which may be, for example, a visible alarm such as red light, or an audible alarm.

Solenoid control 90 provides information which may be displayed at display 96 and optionally printed at printer 98. The information provided is as to the flow of the volume of carrier fluid passing through solenoid control valve 68.

The feed ports 34 and 40 are disposed in bucket 20 in a spaced apart relationship and above upper bath surface 80 and level 52 so that feed port 34 is isolated from the liquid bath 56 and developer liquid entering the bath from feed port 40. Similarly feed port 40 is isolated from liquid bath 56 and fixer entering the bath from feed port 34. In this way precipitation of iron oxide particles in feed ports 34 and 40 and the adjacent vertical legs 32 and 38 of the conduits 30 and 36, as a result of contact with the different liquids, is avoided and conduits 30 and 36 remain free of clogging iron oxide particles.

The vertical leg 32 of the conduit 30 through which spent fixer is fed is suitably maintained flooded, so that the surface area of spent fixer exposed to the atmosphere 88 above liquid bath 56 is minimized, thereby minimizing precipitation of iron oxides in conduit 30 resulting from exposure of the spent fixer to the atmosphere 88 as the spent fixer cascades from feed port 34. In addition maintaining conduit 30 flooded with flowing spent fixer serves to minimize collection of precipitated iron oxides on the interior wall of conduit 30. Precipitated iron oxides which might otherwise collect on exposed walls of the conduit 30, are flushed from the walls by the flowing spent fixer, and cascade with the spent fixer into liquid bath 56.

The vertical leg 38 of the conduit 36 for spent developer may also suitably be maintained in a flooded state although precipitation is less of a problem in the spent developer.

A one way check valve 130 in discharge conduit 16 avoids backflow of liquid effluent into vessel 12, and may be employed to maintain a slight back pressure in discharge conduit 16 to avoid draining conduit 16.

Drain valve 132 permits periodic discharge of solids in zone 54.

In operation, spent fixer loaded with iron ions from a colour photography processor and typically having a pH of 6.5 to 7.5 is fed into bucket 20 through fixer conduit 30 and cascades from feed port 34 falling towards floor 24. Similarly, a spent developer, typically having a pH to 10 to 11, from a colour photography processor is fed through developer conduit 36 into bucket 20 and cascades from feed port 40 falling towards floor 24. With the flow of these two liquids, a liquid bath 56 comprising the two liquids is formed in bucket 20 and the upper bath surface 80 rises as the liquids enter the bucket 20. When the liquid level defined by the bath surface 80 reaches predetermined level 44, sensor 42 dispatches a signal to switch control 90 which activates solenoid control valve 68 to permit entry of carrier liquid, for example, water from a water main into flow drive conduit 62 of pumping unit 14.

The carrier liquid flows through venturi passage 64 thereby creating a suction vacuum in suction conduit 70 so that liquid effluent in bath 56 is drawn through inlet 82 and travels upwardly through conduit 70 entering the venturi passage 64 through outlet 86 and entry port 65 whereby the liquid effluent is entrained in the flowing carrier liquid in venturi passage 64 to form an effluent flow which leaves pumping unit 14 at outlet 66 and flows under pressure through discharge conduit 16 into drain 18. Suitably the flow drive conduit 62 and discharge conduit 16 are dimensioned such that the effluent flow from outlet 66 exits discharge conduit 16 at a flushing pressure which is effective to maintain iron oxide particles in a dispersed state and to flush them through P-trap 76 to drain conduit 78 whereby clogging of drain 18 at drain inlet 74 or in P-trap 76 by agglomeration of iron oxide particles is avoided or minimized.

Liquid effluent entering inlet 82 is filtered by filtering screen 84, which has filtering apertures of a size smaller than the diameter of the venturi passage 64. In this way larger iron oxides particles or agglomerates which might block venturi passage 64, because of their size, are prevented from entering suction conduit 70.

The pumping of liquid effluent upwardly through suction conduit 70 proceeds as the level of liquid bath 56, defined by upper bath surface 80 rises and falls within bucket 20. If the level defined by upper bath surface 80 falls to the predetermined level 48, sensor 46 dispatches a signal to switch control 90 which activates solenoid control valve 68 to interrupt the flow of water into inlet 60. Pumping of the liquid effluent through suction conduit 70 then ceases until the level of liquid bath 56 rises, as a result of introduction of fixer and developer through conduits 30 and 36, to the predetermined level 44, at which sensor 42 dispatches a signal to switch control 90 to activate solenoid control valve 68 to open inlet 60 for further flow of water.

Inlet 82 is disposed below predetermined level 48 so that during pumping inlet 82 is always located in the interior of the liquid bath below upper bath surface 80. In this way, air from atmosphere 88 is not drawn into conduit 70, the oxygen of which air enhances precipitation of iron oxides particles. As a result iron oxides formation within conduit 70, flow drive conduit 62 and discharge conduit 16 arising from contact of the liquid with oxygen is avoided although some precipitation will occur as a result of contact of the two liquids. A major part of the oxides formation arises when the two liquids are mixed in the presence of oxygen.

During operation, iron oxides particles formed in liquid bath 56 as a result of contact between the developer and fixer and also as a result of the exposure of liquid bath 56 to the atmosphere 88 which contains oxygen, settle under gravity into solids collection zone 54. Smaller or finer iron oxides particles may be entrained in the liquid effluent entering conduit 70 and additionally may be formed in conduit 70, flow drive conduit 62, discharge conduit 16 and drain 18, however, the liquid effluent in conduit 70 and the effluent flow being discharged from flow drive conduit 62, flow rapidly under pressure such as to maintain the iron oxides particles in a dispersed, non-clogging state, and they are discharged under a jetting or flushing pressure from discharge conduit 16 into drain 18.

Alarm sensor 50 is a safety option which dispatches a signal to alarm control 92 to generate an alarm 100 if the level of liquid defined by upper bath surface 80 rises to predetermined level 52 which suitably is below feed ports 34 and 40 to avoid formation of iron oxides particles by contact of the liquid within the ports 34 and 40. In general the vessel 12 is proportioned in conjunction with the flow rates of the fixer and developer into vessel 12, and the flow rate of water through flow drive conduit 62 so that the discharge assembly 10 operates with the upper bath surface 80 being maintained below predetermined level 52 and above predetermined level 48, so that the method can be operated on a continuous or continual basis without interruptions as a result of the upper bath surface reaching either level 52 initiating the alarm 100 or level 48 initiating interruption of operation of pumping unit 14.

The operation of solenoid control 90 provides information as to the flow of water entering the flow drive conduit 62 and can provide information as to the amount of water employed which can be fed to display 96 and optionally to printer 98 whereby the amount of water being employed can be monitored.

The method employing the discharge assembly 10 permits discharge of the spent fixer and developer liquids through a single drainage system while avoiding clogging of the draining system or the conduits of the discharge assembly by the iron oxides particles which are generated by the mixing of the two liquids and their exposure to oxygen in the atmosphere.

The accumulated iron oxides particles collected in zone 54 may be removed periodically through a discharge port (not shown) at the bottom of the bucket 20, or the cover 28 with the pumping unit 14 may be removed from bucket 20 to provide access to the interior for removal of the solids and cleaning or for disposal of the bucket 20 and replacement by a new bucket 20 to be employed with the original cover 28 and pumping unit 14.

Manually operated valve 67 may be employed to close outlet 66 producing a backwash to wash venturi passage 64 in the event of clogging in passage 64.

With further reference to FIG. 2, there is shown an alternate structure of fixer conduit 30, in which a retaining cage 126 surrounds feed port 34, and a float ball 128, suitably a hollow plastic ball sits within retaining cage 126 at feed port 34. In use float ball 128 does not hinder flow of spent fixer but reduces or prevents contact between the air in atmosphere 88 and the spent fixer in conduit 30, thereby reducing precipitation of iron oxides in conduit 30.

Float ball 128 floats away from feed port 34 under pressure from flowing spent fixer, but is retained within retaining cage 126.

Developer conduit 36 may be formed in a similar structure.

With further reference to FIG. 3, there is shown a pumping unit 104 which may be employed in place of the pumping unit 14 of FIG. 1. In FIG. 3, parts of pumping unit 104 which are the same as those of pumping unit 14 are identified by the same integers as employed in FIG. 1. Pumping unit 104 has a junction 106 and a three-way valve 108. Pumping line 110 is connected to junction 106. Three-way valve 108 is operated to provide access to venturi passage 64 by effluent liquid in conduit 70 or to pumping line 110. When conduit 70 is closed by valve 108, pumping line 110 may be employed to suction other liquids such as spilled liquids in the vicinity of discharge assembly 10 into flow drive conduit 62 under flow of water therethrough whereby the spilled liquids are entrained by the flow of water and discharged through discharge conduit 16.

With further reference to FIG. 4 there is shown a pumping unit 114 which may be employed in place of the pumping unit 14 in FIG. 1. Parts of pumping unit 114 which are the same as those of pumping unit 14 are identified by the same integers.

Pumping unit 114 has a Y-shaped flow drive conduit 162 having arms 163 and 165. Arm 163 is in flow communication with venturi passage 116 and arm 165 is in flow communication with venturi passage 120. Passage 116 has valves 118 and 119 and passage 120 has valves 121 and 122.

Venturi passage 116 is in flow communication with arm 167 of Y-shaped outlet 166; and venturi passage 120 is in flow communication with arm 169 of outlet 166.

Suction conduit 70 communicates with venturi passage 116 and a pumping line 124 communicates with venturi passage 120.

During operation as described by reference to FIG. 1 for discharge of liquid effluent in vessel 12, valves 121 and 122 close venturi passage 120, while valves 118 and 119 are open to permit passage of water into venturi passage 116. Pumping unit 114 then operates in the same manner as pumping unit 14 as described by reference to FIG. 1. At times when suction conduit 70 is not being employed, pumping unit 114 can be employed to pump other liquid, for example, liquids spilled in the vicinity of the discharge assembly 10. In this case, valves 118 and 119 close passage 116 and valves 121 and 122 are opened to permit access of water in flow drive conduit 62 to venturi passage 120. The flow of water in venturi passage 120 provides a suction or pumping action in pumping line 124 which can be employed to pump or suction such spilled liquids which are then discharged through outlet 66 into discharge conduit 16.

Valves 119 and 121 may also be employed in the manner of valve 67 in FIG. 1 to produce a backwash to wash venturi passages 116 and 120, respectively.

Conveniently the flushing pressure developed in discharge conduit 16 is 30 to 50 psi, preferably about 40 psi.

We claim:

1. A method of generating a dischargeable effluent from colour photography, de-silvered spent photographic fixer liquid containing iron ions, and colour photography, spent alkaline photographic developer liquid, comprising:
   i) feeding a colour photography, de-silvered, spent photographic fixer liquid containing iron ions from a first feed port, and feeding a colour photography spent alkaline photographic developer liquid from a second port to form a mixed liquid bath of a liquid effluent in which iron oxide is precipitated as the liquids mix, said liquid bath having an upper bath surface,
   ii) pumping liquid effluent from an interior of said liquid bath below said upper bath surface, into a flowing carrier liquid to form an effluent flow, said effluent flow comprising said liquid effluent and said carrier liquid, and discharging said effluent flow into a drain, and
   iii) maintaining the feeds of liquid from said first and second ports, such that the liquids are isolated from contact above the upper bath surface as the liquids exit said ports,
   wherein said liquid effluent is pumped from said liquid bath by a venturi flow of said carrier liquid.

2. A method according to claim 1, wherein said carrier liquid is water.

3. A method according to claim 1, wherein said flowing carrier liquid flows through a venturi passage to a discharge conduit, said venturi passage being in flow communication with said interior of said liquid bath, and liquid effluent is suctioned from said bath into said venturi passage and entrained by said flowing carrier liquid to form said effluent flow, and said effluent flow is discharged through said discharge conduit.

4. A method according to claim 3, wherein said carrier liquid is water.

5. A method according to claim 4, wherein said flow communication is provided by an elongate conduit having an inlet end in said interior of said liquid bath and an outlet end at said venturi passage, and including filtering liquid effluent entering said inlet end to prevent passage of iron oxide particles having a particle size that would obstruct the venturi passage.

6. A method according to claim 4, wherein step i) comprises feeding said fixer liquid through a first feed conduit terminating in said first feed port, and feeding said developer liquid through a second feed conduit terminating in said second feed port, said first and second feed conduits extending vertically through said bath and upper bath surface, such that fixer liquid cascades from said first feed port to the bath below, and said developer liquid cascades from said second feed port to the bath below.

7. A method according to claim 5, wherein said effluent flow is discharged from said discharge conduit into said drain under a flushing pressure effective to flush iron oxide particles from a solids trap of the drain.

8. A method according to claim 7, wherein said effluent flow contains said carrier liquid and said liquid effluent in a volume ratio of at least 1.5:1.

9. A method according to claim 8, wherein said fixer liquid has a pH of 6.5 to 7.5 and said developer liquid has a pH of 10 to 11.

10. A method according to claim 6, further comprising establishing a predetermined first level for said upper bath surface and a predetermined second level for said upper bath surface; said predetermined first level being above said predetermined second level and below said feed ports; said predetermined second level being above said inlet end of said elongate conduit, and initiating flow of said flowing carrier liquid when said upper bath surface rises to said first level and interrupting the flow of said flowing carrier liquid when said upper bath surface falls to said second level.

11. A method according to claim 3, wherein said flow communication is provided with an elongate conduit having an inlet end in said interior of said liquid bath and an outlet end at said venturi passage.

12. A method according to claim 11, further comprising establishing a predetermined first level for said upper bath surface and a predetermined second level for said upper bath surface; said predetermined first level being above said predetermined second level; said predetermined second level being above said inlet end of said elongate conduit and initiating flow of said flowing carrier liquid when said upper bath surface rises to said first level and interrupting the flow of said flowing carrier liquid when said upper bath surface falls to said second level.

13. A discharge assembly for generating a dischargeable effluent from colour photography, de-silvered spent photographic fixer liquid containing iron ions, and colour photography, spent alkaline photographic developer liquid, comprising:
 a) a housing for supporting a mixed liquid bath of a liquid effluent derived from the fixer liquid and the developer liquid,
 b) a first feed port for feeding fixer liquid into said housing, and a second feed port for feeding developer liquid into said housing to form said bath, said first and second feed ports being disposed in said housing such that fixer liquid exiting said first feed port and developer liquid exiting said second feed port are isolated from contact above the bath surface, and
 c) a discharge assembly comprising:
  i) pumping means for pumping liquid effluent from said bath to form an effluent flow, and
  ii) a discharge means for discharging the effluent flow from said pumping means,
  wherein said pumping means comprises:
 A) a flow conduit means for flow of a carrier liquid for the liquid effluent, said flow conduit means having an inlet for communication with a source of said carrier liquid and a discharge outlet for discharge of liquid flowing in said flow conduit means, said discharge outlet communicating with said discharge means;
 B) an elongate conduit providing flow communication between said housing and said flow conduit means, said elongate conduit having an inlet adapted to be disposed in the interior of a liquid bath supported in said housing, and an outlet at said flow conduit means, and
 C) suction means in said flow conduit means for suction pumping liquid effluent along said elongate conduit from said housing into entrainment by carrier liquid flowing in said flow conduit means.

14. A discharge assembly according to claim 13, wherein said suction means comprises a venturi passage in said flow conduit means, said outlet of said elongate conduit being in flow communication with said venturi passage.

15. A discharge assembly according to claim 14, wherein said housing has a floor, a wall extending upwardly from said floor and an open top, and further including a cover for removably covering the housing open top, said flow conduit means being supported by said cover.

16. A discharge assembly according to claim 15, further including a first sensor for providing a first signal when an upper bath surface of a bath supported in the housing reaches a predetermined first level in the housing, and a second sensor for providing a second signal when the upper bath surface reaches a predetermined second level, and
 means for initiating flow of the carrier liquid in said flow conduit means in response to said first signal, and interrupting flow of the carrier liquid in said flow conduit means in response to said second signal.

17. A discharge assembly according to claim 16, further including a first feed conduit extending through said wall into said housing and terminating in said first feed port and a second feed conduit extending through said wall into said housing and terminating in said second feed port, said first and second conduits extending vertically within said housing in spaced apart relationship, and said first and second feed ports being disposed above said predetermined upper level.

18. A discharge assembly according to claim 15, further including an entry port in said elongate conduit and valve means to selectively control flow of liquid to said venturi passage from said inlet and from said entry port.

19. A discharge assembly according to claim 18, further including a suction conduit affixed to said entry port.

20. A discharge assembly according to claim 15, further including a valve controlled by-pass venturi passage in said flow conduit means and a suction conduit in flow communication with said by-pass venturi passage.

21. A discharge assembly according to claim 17, further including a third sensor for producing an alarm signal if said upper bath surface reaches a predetermined alarm level above said upper level.

* * * * *